United States Patent [19]

Smith et al.

[11] Patent Number: 4,792,462

[45] Date of Patent: Dec. 20, 1988

[54] METHOD OF APPLYING INSULATING MATERIAL TO WINDINGS IN ELECTRICAL MACHINERY

[75] Inventors: William R. Smith, Gallatin, Tenn.; Marvin W. Sheets, Los Gatos, Calif.; Paul W. Greenlee, Hendersonville, Tenn.

[73] Assignee: General Electric Company, Fort Wayne, Ind.

[21] Appl. No.: 801,901

[22] Filed: Nov. 26, 1985

Related U.S. Application Data

[63] Continuation of Ser. No. 563,761, Dec. 21, 1983, abandoned.

[51] Int. Cl.$^4$ .................. B05D 3/14; B05D 3/02; B05D 1/18
[52] U.S. Cl. ........................... 427/49; 427/116; 427/379; 427/388.2; 427/435
[58] Field of Search .............. 427/49, 116, 379, 388.2, 427/435

[56] References Cited

U.S. PATENT DOCUMENTS 2,414,525  1/1947  Hill et al. .................. 427/116 X
3,904,785  9/1975  Baumann .................. 427/49 X

OTHER PUBLICATIONS

"GE 701 Solventless Varnish", application data sheet AD-404, Schenectady, N.Y., General Electric Co., Insulating Materials, Jul. 19, 1977.
"GE 701 Solventless Varnish", product data sheet PD-411, Schenectady, N.Y., General Electric Co., Insulating Materials, Oct. 15, 1970.

*Primary Examiner*—Evan Lawrence
*Attorney, Agent, or Firm*—Ralph E. Krisher, Jr.

[57] ABSTRACT

A method of applying solventless varnish to stator windings in electrical machinery. A magnetic core having a plurality of stator windings disposed in the slots of the core is positioned above a tank containing a solventless varnish, and the tank is then raised to immerse the end turns of the windings on one end of the core into the varnish. The windings are energized to heat them and the varnish which adheres to the end turns to reduce the viscosity of the varnish. The tank is then lowered and the stator and windings are inverted so that a portion of the reduced viscosity varnish which adheres to the end turns flows downwardly through the slots of the stator. This is repeated until varnish begins to flow freely through the slots to the other end, thereby indicating that good coating of the winding within the slots has been accomplished. Next, the current through the windings is increased to raise the temperature of the end turns of the windings to the gel point of the varnish, and the end turns on both ends of the stator are then alternately dipped into the varnish bath to build up a protective coating on the end turns. Once a sufficient thickness has been achieved, the current through the windings is increased further to raise the temperature of the windings to the point where the adhered varnish cures. Then, the stator components not heated by the resistance heating are cured in an oven.

20 Claims, 1 Drawing Sheet

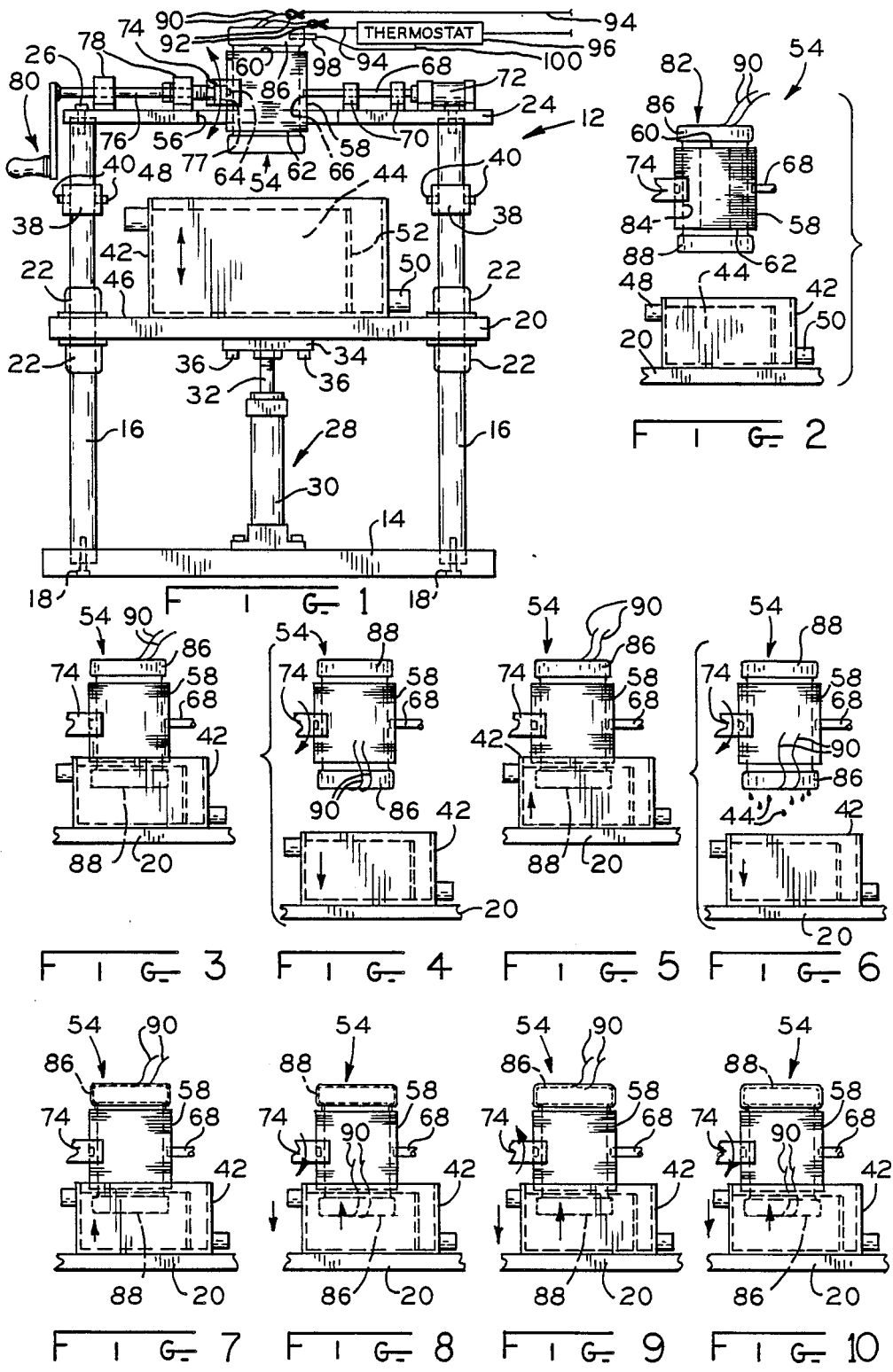

METHOD OF APPLYING INSULATING MATERIAL TO WINDINGS IN ELECTRICAL MACHINERY

This is a continuation of application Ser. No. 563,761 filed Dec. 21, 1983 now abandoned.

BACKGROUND OF THE INVENTION

The present invention relates to applying a protective coating of an electrical insulating material to the stator windings of a motor or other electrical inductive device.

Although the stator windings of electrical inductive devices, such as motors, as wound with magnet wire having an enamel or other insulative coating thereon, it is often desirable to further coat the windings and seal them from the environment. Small cracks in the wire insulation and other small, localized areas on the wire where the insulation has been worn off will usually not present any problems in normal motor applications. When the motor is used in environments where the stator is exposed to moisture or abrasive materials, such as sand and dirt, it is often desirable to further protect the stator windings from the environment by means of an additional coating. For example, open motors utilized in driving pumps in oil field applications are exposed directly to blowing sand and dirt as well as moisture. Additional protection of the stator windings is also desirable in blower motors utilized in the cooling systems for locomotive traction motors.

The usual material for coating stator windings is a solventless varnish that has a hardener mixed therein so that the varnish will cure at a given elevated temperature, such as 170° C. The present method of application solventless varnish to stator windings comprises energizing the windings with an applied voltage to raise the temperature of the windings to about 95° C. and then applying the varnish with a wand, which is a tube through which the varnish is flowed. Either the stator or the wand may be rotated. The varnish is applied with the wand to the end turns on both ends of the stator core, and the varnish is caused to flow into the slots of the core. The application of the varnish is then discontinued and the windings are energized with a higher current to increase their temperature to 145° C. to gel the varnish and then to 170° C. to cure the varnish.

It has been found that this method does not provide an even distribution of the varnish throughout the winding, particularly in the portion of the winding disposed within the core slots, nor does it provide a continuous coating over the end turns to protect them from the environment in open electrical machinery. Furthermore, the coating of varnish on the end turns is quite thin because the varnish is applied with the end turns at 95° C., which is below the gel temperature of the varnish. Accordingly, the varnish will not build up on the end turns to provide a thicker coating.

It has also been proposed to dip the end turn portions of the windings in a solventless varnish, but again this has been done at a temperature below the gel temperature of the varnish so that only a thin coating of varnish is applied to the end turns.

It is known to coat the stator windings with a protective layer of insulation by immersing the stator within a fluidized bed of powdered insulating material and then resistance heating the windings to melt the powder and adhere it to the windings. U.S. Pat. Nos. 3,244,918; 3,145,127 and 3,710,437 are examples of this type of method. It is also known to encapsulate a stator within an insulating resinous material by dipping part of the stator and windings in a bath of thick resinous coating material, curing the material, then impregnating the entire stator with a thin resinous material, curing that material and then immersing the other portion of the stator in the thick material to completely encapsulate the same. This type of method is disclosed in U.S. Pat. No. 2,414,525.

SUMMARY OF THE INVENTION

The present invention, in accordance with one form thereof, overcomes the problems and disadvantages of prior art methods of coating stator windings by immersing the stator end turns in a solventless varnish with the windings being maintained at two distint temperatures. Initially, the end turns on one end of the magnetic core are heated to a temperature which causes the varnish that adheres to the windings to have a relatively low viscosity so that when the core and windings are inverted, the varnish that adheres to the end turns will flow downwardly into the slots of the core thereby providing good coating of the portions of the windings that are disposed within the slots. The sequential steps of immersing one set of end turns in the varnish and inverting the core and windings are repeated until a good flow of varnish through the slots is established, thereby indicating that the windings within the slots have been thoroughly coated with the low viscosity varnish.

Next, the temperature of the windings is raised to the gel temperature of the varnish by increasing the current that flows through the stator windings. The sets of end turns on both ends of the core are then alternately dipped into the bath of varnish up to the perspective end faces of the core, and since the temperature of the windings is at the gel temperature of the varnish, the varnish will immediately form a thick, jelly-like coating on the end turns which is sufficiently viscous that it will not flow appreciably down into the slots of the core. Because the varnish gels, repeated immersions of the end turns will cause the varnish to build up on the end turns to form a coating which is significantly thicker than the coating of varnish on the portion of the windings within the slots, which was applied at a temperature below the gel temperature of the varnish.

When the coating of varnish buildup on the end turns of the stator is sufficiently thick, increased current is passed through the windings to raise the temperature of the windings to the cure temperature of the varnish, at which point the varnish adhered to the windings will cure. Since the heat generated by the resistive heating of the windings is not sufficient to heat the leads and slot insulation to a level where the varnish adhered thereto will cure, the stator is then placed in an oven for several minutes to cure the varnish on the leads and core insulation and other components of the stator that are coated with the uncured varnish.

It is an object of the present invention to provide a method of coating the windings of a stator with a protective material wherein thorough coating of the portion of the windings within the core slots is achieved.

It is a further object of the present invention to provide a method of coating the end turns of a stator winding wherein the end turns are substantially encapsulated in a coating of the material that is sufficiently thick to provide good protection of the end turns against moisture and contaminants.

A still further object of the present invention is to provide a method of coating stator windings with a liquid protective material wherein the liquid is more uniformly distributed throughout the winding and more uniformly coats the end turns thereof.

Another object of the present invention is to provide a method for semi-encapsulating a stator winding with a protective, electrically insulating material.

Yet another object of the present invention is to provide a method for coating a stator winding that is capable of being automated.

The invention provides, in one form thereof, a method of coating insulation on a winding comprising a plurality of turns of wire disposed in the slots of a magnetic core wherein a portion of the winding protrudes from one end of the core. The protruding portion of the winding is immersed in a bath of liquid electrical insulating material to adhere insulating material to the immersed portion of the winding. The winding is then removed from the bath and the core and winding are inverted to position the protruding portion of the winding above the core while maintaining the viscosity of the material adhering to the winding sufficiently low to cause some of the adhered material to flow down into the slots of the core. The steps of immersing and inverting are repeated until the insulating material coats at least a portion of the winding in the slots of the core and flows through the slots to the other end of the core. Then, the protruding portion of the winding is repeatedly immersed into liquid electrical insulating material to adhere insulating material to the protruding portion while raising the temperature of the adhered material to increase the viscosity of the adhered material sufficiently to cause the insulating material to build up on the protruding portion of the winding and form a significantly thicker coating thereon that is formed on the portion of the winding within the slots. Then, the insulating material that is coated on the winding is cured.

The invention further provides, in one form thereof, a method of coating insulation on a winding comprising a plurality of turns of wire disposed in the slots of a magnetic core and having first and second end turn portions that protrude beyond respective end faces of the core. The method comprises positioning the core and winding such that the first end turn portion is below the core and the first end portion is immersed in a bath of electrical insulating material to adhere insulating material to the first end turn portion. Following removal of the first end turn portin from the bath, the core and winding are inverted to position the first end turn portion above the core, and while maintaining the temperature of the material adhered to the first end turn portion at a level whereby the viscosity of the adhered material is low, permitting some of the adhered material to flow down into the slots of the core to coat the portion of the winding disposed within the core slots. The steps of positioning, immersing, and inverting the core and winding are repeated until insulation material that has flowed into the slots reaches the other end of the core and most of the winding within the slots has been coated. Then, the first and second end turn portions are alternately and repeatedly immersed in the bath of insulating material to adhere the insulating material to the protruding portions while raising the temperature of the adhered material to increase the viscosity of the adhered material to thereby cause a plurality of layers of the insulation to build up on the end portions. Then, the insulating material that is coated on the winding is cured.

Still further, a method in accordance with one form of the invention is provided for coating insulation on a winding comprising a plurality of turns of wire disposed in slots of a magnetic core wherein one end portion of the winding protrudes from one end of the core comprising applying liquid electrical insulating material to said one end portion of the winding. The core and winding are oriented to position the core below the end portion of the winding to which the insulating material is applied to cause a portion of the insulating material to flow downwardly through the slots of the core to the other end thereby coating the wire that is inside the core slots. The end portion of the winding is then repeatedly immersed in a bath of electrical insulating material and the viscosity of the adhered material is raised to a level which is sufficiently high that the repeated immersion of the end portion causes respective layers of the insulating material to build up on and coat the end portion of the winding. Next, the insulating material that is coated on the winding is cured.

In yet another form of the invention, a method is provided for coating a protective material on a winding comprising a plurality of turns of wire disposed in slots of a magnetic core wherein an end portion of the winding protrudes from one end face of the core. A bath of liquid protective material is provided, and the protruding end portion of the winding is immersed in the bath to adhere protective material to the end portion of the winding. The end portion of the winding is removed from the bath. Resistance heating of the winding is achieved by passing current through the end portion to raise the temperature of the material that adheres to the winding end portion thereby reducing the viscosity of the protective material, and the core and winding are inverted to position the core below the winding end portion to cause some of the adhered material to flow down into the slots of the core and coat the wire that is within the slots. The steps of immersing and inverting are repeated until the wire within the slots is coated to the desired degree. Next, the end portion of the winding is immersed into the bath to adhere additional protective material thereto while resistance heating the end portion by passing current therethrough to raise the temperature of the material adhered to the end portion to thereby thicken the material and cause it to build up in layers on the end portion with each successive immersion. Then, the winding is further heated by resistance heating to further raise the temperature of the material that has coated the winding within the slots and build up on the end portion sufficiently to cure the adhered and built up material.

BRIEF DESCRIPTION OF THE DRAWINGS

FIG. 1 is a diagrammatic elevational of an apparatus suitable for performing the method of the present invention, in accordance with at least one form thereof;

FIG. 2 is a diagrammatic view showing the stator positioned above a bath of the protective material;

FIG. 3 is a diagrammatic view showing one of the end turns of the stator being immersed in the bath of protective material in accordance with one form of the invention;

FIG. 4 is a diagrammatic view showing the bath lowered away from the stator, and the stator inverted to position the coated end turns above the core;

FIG. 5 is a view similar to FIG. 3 showing the end turns again being immersed in the bath;

FIG. 6 is a view similar to FIG. 4 again showing the bath lowered away and the stator inverted;

FIG. 7 is a diagrammatic view showing one of the end turn portions of the windings immersed in a bath of protective material wherein the windings are heated to the gel temperature of the protective material in accordance with one form of the invention;

FIG. 8 is a diagrammatic view showing the other set of end turns of the windings being immersed in the bath and heated to the gel temperature of the protective materials;

FIG. 9 is a view similar to FIG. 7 showing a repeated immersion of one set of end turns; and FIG. 10 is a view similar to FIG. 8 showing a repeated immersion of the other set of end turns.

DETAILED DESCRIPTION OF THE PREFERRED EMBODIMENT

With reference now to the drawings, a method in accordance with a preferred form of the invention will be described in further detail. FIG. 1 illustrates, in diagrammatic fashion, an apparatus 12 suitable for performing the preferred method in accordance with the invention. Coating apparatus 12 comprises base 14 to which a pair of vertical guide posts 16 are connected, as by screws 18. A moveable support plate 20 is slidably connected to guide posts 16 by bushings 22, and upper stator support plate 24 is fixedly connected to guide posts 16, as by screws 25. Moveable tank support plate 20 is raised and lowered by a hydraulic cylinder 28 wherein the cylinder portion 30 is fixedly connected to base plate 14 and its plunger 32 connected to moveable plate 20 by means of mounting plate 34 and screws 36. Hydraulic cylinder 28 is connected to a suitable source of pressurized hydraulic fluid through valving (not shown) to control the movement of plate 20. Stop collars 38 are slidably received over guide posts 16 and locked into the desired vertical position by set screws 40.

Tank 42, which contains a solventless varnish 44 to be described in greater detail hereinafter, is mounted to the upper surface 46 of moveable plate 20. Tank 42 includes an inlet 48 connected to a reservoir of the varnish (not shown) and an outlet 50 also connected to the reservoir. By means of a pump or the like, the solventless varnish is pumped into tank 42 through inlet 48 and out outlet 50 back to the reservoir in a recirculating fashion. Wall member 52 extends completely across tank 42 in the front to back direction as shown in FIG. 1 to maintain the desired varnish 44 within tank 42. It is highly desirable to maintain the level of varnish 44 within tank 42 at a precisely controlled level so that only the end turns of the stator 54 are immersed in varnish 44 when plate bushings 20 abut stop collars 38.

Upper support plate 24 is provided with a cut out portion 56 therein that is sufficiently large to permit stator 54 to be inverted, as will be described hereinafter. The magnetic core 58 of stator 54 includes a pair of recesses drilled therein halfway between the end faces 60 and 62 and dimensioned to receive pin 64 and the end 66 of rod 68. Rod 68 is slidably received in bushings 70 mounted to plate 24 and reciprocated by hydraulic cylinder 72. Alternatively, rod 68 could be manually reciprocated and locked into its extended position in engagement with core 58 of stator 54.

Pin 64 is connected to clamping jaw 74 having a face 77 that is arcuate and complementary to the surface of core 58. Jaw 74 is connected to shaft 76 rotatably received in bushings 78 and rotated by hand crank 80.

Stator 54 may be the stator of an electric motor, or any other inductive device wherein windings 82 are disposed in the slots 84 of a magnetic core 58. As is customary, winding 82 comprises a plurality of turns of magnet wire coated with an insulating material, such as a suitable enamel. The end turns 86 and 88 of windings 82 protrude beyond the end faces 60 and 62 of core 58 in customary fashion, and leads 90 are provided for connecting stator windings 82 to a source of electrical current when the motor or other inductive device is placed in service.

In performing the method according to one form of the invention, stator 54 is clamped between jaw 74 and rod 68 such that pin 64 and the end 66 of rod 68 engage the openings in core 58. Leads 90 of winding 82 are connected by clips 92 and wires 94 to a source of voltage (not shown) wherein one of the wires 94 is connected through thermostat 96. Temperature probe 98, which is embedded within end turns 86 of winding 82, is connected to theremostat 96 by lead 100. The setting of thermostat 96 may be adjusted to connect the source of voltage to stator 54 when the temperature sensed by probe 98 falls below the temperature level set into thermostat 96.

Solventless varnish 44 is circulated through tank 42, and although a particular type of solventless varnish will be described, it should be understood that the invention is not limited to any particular varnish and any other material suitable for coating stator windings 82 could be used. The preferred protective material 44 is No. 701A varnish manufactured by the General Electric Company. The varnish is 70% unsaturated polyester and about 30% vinyl toluene with a trace of quinone. The varnish is mixed in a ratio of 5 gallons of varnish to 6 ounces of hardener, which is type 701B organic peroxide hardener manufactured by the General Electric Company. The hardener is a T-butyl perbenzoate. The varnish-hardener mixture 44 is preferably maintained at a temperature of about 50° C. to 60° C. within tank 42. Although the type 701 varnish is preferred, other varnishes and other protective liquid materials could be utilized for the method, but it is preferred that the varnish or protective material have a low viscosity at one temperature, and then thicken or gel at another, higher temperature so that the desired permeating and coating characteristics of the method can be realized.

With thermostat 96 set at approximately 95° C., current will be passed through windings 82 to raise the temperature of windings 82 until the temperature of approximately 95° sensed by probe 98 is maintained. With six and nine lead motors, the voltage source for energizing windings 82 is preferably 208 volts, and with a three lead motor, 120 volts.

Stator 54 is positioned as shown in FIG. 2 with the end turns 86 including leads 90 positioned above magnetic core 58. Then, end turns 88 are immersed in the bath 44 of varnish (FIG. 3) by activating hydraulic cylinder 28 to raise tank 42 until bushings 22 abut stop collars 38. This will immerse end turns 88 within varnish 44 just up to the end face 62 of magnetic core 58. End turns 88 are permitted to remain in bath 44 for about 30 to 40 seconds, and then tank 42 is lowered and stator 54 inverted by turning hand crank 80 to the position shown in FIG. 4 wherein end turns 88, which were previously immersed in bath 44, are positioned directly above core 58. The varnish 44 that adheres to end turns 88 will be heated by the elevated temperature of end turns 88 to cause the varnish to have a reduced viscosity of about 1,000 centipoise, at 45-50 seconds on a No. 5 Zahn cup. Stator 54 is held in the position shown in FIG. 4 for approximately 20 seconds, during which time a portion of the reduced viscosity varnish 44 that had adhered to end turns 88 will drip and flow downwardly through the slots 84 in core 58 thereby permeating the portions of winding 82 disposed within slots 84.

The steps shown in FIG. 3 and 4 are repeated several times, for example five additional repetitions, until the varnish begins to flow freely out of slots 84 from the other end 60 of core 58, thereby indicating that good coating of the winding 82 within slots 84 has been achieved. The number of repetitions of the steps shown in FIGS. 3 and 4 will, of course, depend on the particular stator 54 in question, on the viscosity of the varnish, and other factors. What is important, however, is that the windings within slots 84 be sufficiently coated to a desired level, which is normally indicated by free flowing of the varnish 84 from the end of stator 54 opposite that which is being immersed (FIG. 6). FIGS. 3 through 6 illustrate the repeated immersion, inversion and draining steps of this portion of the method.

Next, thermostat 96 is set at approximately 145° C., which is the gel temperature of varnish 44. Then, end turns 86 and 88 are alternately immersed in bath 44 by raising tank 42 to immerse one of the end turn portions 86 or 88, lowering tank 42, inverting stator 54 180° C., raising tank 42 to immerse the other end turn portion 86 or 88, lowering tank 42, again inverting stator 54 and immersing the first end turn portion 86 or 88, and so forth. End portions 86 and 88 are alternately immersed six to eight times, or until a desired thickness of varnish has built up on end turn portions 86 and 88.

Because of the higher temperature of end turn portions 86 and 88, varnish 84 that adheres thereto will gel, that is, go from a liquid state to a jelly-like or adhesive state. What is important is that the varnish or other protective material becomes sufficiently thick that repeated immersions of end turns 86 and 88 will cause the varnish or material to build up an additional layer with each immersion, a result which does not occur with the varnish 44 at the lower temperature, and therefore, lower viscosity level. At the lower viscosity level, the varnish 84 is intended to flow downwardly into the stator, whereas at the higher viscosity or gel level, varnish 84 will adhere to and build up on end turns 86 and 88. Different coating materials will perform differently, but as long as material becomes sufficiently thick to build up layers with successive immersions in the bath 44, the material can be used in the method according to this form of the invention.

Each end turn 86 and 88 of stator 54 is dipped eight times when practicing the method in accordance with this embodiment of the invention, with the end turns 86 and 88 being immersed for two seconds during each immersion step. Stator 54 is held above bath 44 for ten seconds to allow the excess varnish to drip off, and stator 54 is then immediately inverted and the same step performed on the opposite end. It is preferred that between 1/16 and 3/32 inch of varnish be built up on each end turn 86 and 88. This semi-encapsulates stator 54 and provides extremely good protection for end turns 86 and 88, which are the portions of winding 82 which are most exposed to the environment. FIGS. 7-10 illustrate the repetitive steps of immersing end turns 86 and 88 to build up varnish thereon.

After a sufficient thickness of varnish has been built up on end turns 86 and 88, stator 54 is held above tank 42, and thermostat 36 is set to approximately 170° C. thereby increasing the temperature of winding 82 to approximately 170° C. This cures the varnish 44 which has adhered to winding 82, both on end turns 86 and 88 and on the portion of winding 82 within slots 84. Approximately ten minutes is required to cure varnish 44.

Since leads 90 and the cuffs of slot insulators (not shown) are generally too far removed from windings 82 to be heated up to the cure temperature, stator 54 is then removed from apparatus 12 and placed within a 150° C. oven (not shown) for approximately five minutes to cure the varnish 44 thereon. At this point, end turns 86 and 88 of stator 54 are encapsulated by cured varnish, the portion of winding 82 within slots 86 is coated with a thinner protective coating of cured varnish, and the varnish on leads 90 and other portions of stator 54 are cured as well. Stator 54 is now ready for assembly into the completed motor.

When using the type 701A varnish and 701B hardener, the preferred range for windings 82 during the step of impregnating winding 82 with the low viscosity varnish is 94° C.–100° C., and the preferred viscosity range is 850–1150 centipoise, 45–60 seconds on a number 5 Zahn cup, 25° C. The varnish has a gel time of 13–25 minutes at 100° C., and the temperature range of windings 82 during the steps of building up varnish on end turns 86 and 88 is 145° C. to 155° C. The preferred temperature range during the curing step is 160° C. to 170° C.

Although the disclosed form of the method shows tank 42 being raised and lowered to immerse end turn portions 86 and 88, an alternative arrangement is also possible wherein tank 42 would remain stationary and stator 54 would be raised and lowered. This could be accomplished by mounting upper plate 24 on bushings and raising and lowering it relative to intermediate plate 20 by means of a hydraulic cylinder.

Although a particular apparatus and form of method has been disclosed as preferred for practicing the invention, it is contemplated that changes and modifications may be made therein without departing from the invention. Certain changes may be made by those having ordinary skill in the art without departing from the spirit of the invention or the scope thereof as set forth by the claims which follow.

We claim:

1. A method of coating insulation on a winding comprising a plurality of turns of wire disposed in slots of a magnetic core wherein a portion of the winding protrudes from opposite ends of the core wherein the insulation is formed from a liquid insulating material characterized by having a first viscosity level at a first temperature range, by having a viscosity level less than the first viscosity level at a second temperature range higher than the first temperature range, by gelling at a third temperature range above the second temperature range and thereby having a viscosity level greater than the first viscosity level, and by curing at sufficiently high temperatures, the method comprising:

immersing the portion of the winding protruding from a first end of the core in a bath of the liquid electrical insulating material, while the windings are at a temperature in the second temperature range, to adhere insulating material to the immersed portion of the winding, and removing the winding from the bath;

then inverting the core and winding to position the first protruding portion of the winding above the core while maintaining the viscosity of the material adhering to the winding sufficiently low, due to the temperature of the windings being in the second temperature range, to cause some of the adhered material to flow down into the slots of the core;

repeating the steps of immersing and inverting until the insulating material coats at least a portion of the winding in the slots of the core and flows through the slots to the other end of the core;

then repeatedly immersing the first-protruding portion of the winding into liquid electrical insulating material to adhere insulating material to the first protruding portion while raising the temperature of the adhered material to the third temperature range to increase the viscosity of the adhered material sufficiently to cause the insulating material to build up on the first protruding portion of the winding and form a significantly thicker coating thereon than is formed on the portion of the winding within the slots; and then curing the insulated material coated on the winding.

2. The method of claim 1 including, after repeatedly immersing the first protruding portion of the winding but prior to curing, the step of repeatedly immersing a second portion of the winding protruding from the opposite end of the core into liquid electrical insulating material to adhere insulating material to the second portion while raising the temperature of the material adhered thereto to the third temperature range, thereby to increase the viscosity of the adhered material sufficiently to cause the material to build up on the second protruding portion.

3. The method of claim 2 wherein the step of raising the temperature of the adhered material comprises heating the protruding portions of the winding.

4. The method of claim 3 wherein the step of heating the protruding portions of the winding comprises resistance heating of the winding.

5. The method of claim 2 wherein the protruding portions of the winding are alternately immersed to build up the coating of material thereon.

6. The method of claim 1 wherein the step of raising the temperature of the adhered material comprises resistance heating of the winding.

7. The method of claim 1 wherein: the temperature of the adhered material during the steps of repeatedly immersing and inverting to coat the winding within the slots is maintained in a range from about 95° C. to 100° C., and the temperature of the adhered material during the step of building up a coating on the protruding portion is maintained within a range from about 145° C. to about 155° C.

8. The method of claim 1 wherein the viscosity of adhered material during the steps of repeatedly immersing and inverting to coat the winding within the slots is maintained within a range from about 850 centipoise to about 1150 centipoise at 25° C., measuring 45-60 on a No. 5 Zahn cup.

9. The method of claim 1 wherein the step of curing comprises resistance heating of the winding to a temperature at which the coated material cures.

10. The method of claim 1 wherein the insulating material is a solventless varnish.

11. The method of coating insulation on a winding comprising a plurality of turns of wire disposed in slots of a magnetic core and having first and second end portions that protrude beyond respective end faces of the core, wherein the insulation is formed from a liquid insulating material characterized by having a first viscosity level in a first temperature range, by having a viscosity level less than the first viscosity level at a second temperature range higher than the first temperature range, by gelling at a third temperature range above the second temperature range and thereby having a viscosity level greater than the first viscosity level, and by curing at a sufficiently high temperature, said method comprising:

positioning the core and windings such that the first end turn portion is below the core and immersing the first end turn portion in a bath of liquid electrical insulating material to adhere insulating material to the first end turn portion and removing the first end turn portion from the bath;

then inverting the core and winding to a position wherein the first end turn portion is above the core, and while maintaining the temperature of the material adhered to the first end turn portion at a level in the second temperature range whereby the viscosity of the adhered material is low, permitting some of the adhered material to flow down into the slots of the core to coat a portion of the winding disposed within the core slots;

repeating the steps of positioning, immersing and inverting the core and winding until insulation material that has flowed into the slots reaches the other end of the core and most of the winding within the slots has been coated;

then alternately and repeatedly immersing the first and second end turn portions in the bath of insulating material to adhere the insulating material to the protruding portions while raising the temperature of the adhered material to a level in the third temperature range to increase the viscosity of the adhered material to cause a plurality of layers of insulation to build up on the end portions; and then curing the insulating material coated on the winding.

12. The method of claim 11 including: heating the winding to a first temperature in the second temperature range by means of resistance heating during the steps of immersing and inverting to coat the wire in the slots, heating the winding by resistance heating to a second temperature in the third temperature range higher than the first temperature to increase the viscosity during the step of building layers of coating on the end turn portions, and heating the winding by means of resistance heating to a cure temperature for the insulating material during the step of curing.

13. The method of claim 12 including: sensing the temperature of one of the end turn portions and applying current to the winding in response to the temperature sensed to raise the temperature of the winding to the respective first, second or cure temperature.

14. The method of claim 11 wherein the insulating material is a solventless varnish, and including: heating the winding by means of resistance heating to a temperature in the second temperature range at which the varnish is at a low viscosity during the steps of immersing and inverting to coat the wire within the slots; heating the winding by resistance heating to a temperature the third temperature range at which the adhered varnish gels during the step of coating build up, and heating the winding by resistance heating to the cure temperature of the varnish during the step of curing.

15. The method of claim 11 including maintaining the winding and core vertically stationary and raising and lowering the bath to immerse the end portions therein for each immersing step.

16. The method of coating insulation on a winding comprising a plurality of turns of wire disposed in slots of a magnetic core wherein end portions of the winding protrudes from both ends of the core wherein the insulation is formed from a liquid insulating material characterized by having a first viscosity level in a first temperature range, by having a viscosity level less than the first viscosity level at a second temperature range higher than the first temperature range, by gelling at a third temperature range above the second temperature range and thereby having a viscosity level greater than the first viscosity level, and by curing at a sufficiently high temperature, the method comprising:

applying liquid electrical insulating material to one end portion of the winding having a temperature in the second temperature range, and orienting the winding and core to position the core below the one end portion of the winding to which the insulating material is applied to cause a portion of the insulating material to flow through the slots to the other end of the core and coat the wire inside the core slots;

then repeatedly immersing the one end portion of the winding in a bath of electrical insulating material to cause the electrical insulating material to adhere to the immersed end portion and raising the temperature of the end portion to a level in the third temperature range to raise the viscosity of the insulating material which adheres to the end portion to a level that is sufficiently high that repeated immersions of the winding end portion cause respective layers of the insulating material to build up on and coat the one end portion; and curing the insulating material that has coated the winding.

17. The method of claim 16 including the step of resistance heating the winding during the steps of repeatedly immersing the end portion to raise the temperature of the insulating material as it coats the one end portion to thereby increase the viscosity of the material to a level where the material builds up on the one end portion.

18. The method of claim 17 wherein the step of curing comprises resistance heating the winding to heat the insulating material on the winding to its cure temperature.

19. A method of coating a protective material onto a winding comprising a plurality of turns of wire disposed in slots of a magnetic core wherein an end portion of the winding protrudes from one end of the core comprising: providing a bath of liquid protective material characterized by having a first viscosity level in a first temperature range, by having a viscosity level less than the first viscosity level at a second temperature range higher than the first temperature range, by gelling at a temperature range above the second temperature range and thereby having a viscosity level greater than the first viscosity level and by curing at a sufficiently high temperature; immersing the end portion of the winding in the bath to adhere protective material to the end portion of the winding, removing the end portion from the bath, resistance heating the winding end portion by passing current through the end portion to raise the temperature of the material that adheres to the winding end portion to a temperature level in the second temperature range thereby reducing the viscosity of the adhered protective material; orienting the core and winding to position the core below the winding end portion to cause some of the reduced viscosity adhered material to flow down into the slots of the core and coat the wire that is within the slots; repeating the steps of immersing and inverting until the wire within the slots is coated to a desired degree; then repeatedly immersing the end portion of the winding into the bath to adhere additional protective material to the end portion while resistance heating the end portion by passing current therethrough to raise the temperature of the material adhered to the end portion to a temperature level in the third temperature range to thereby thicken the material and cause it to build up on the end portion with each successive immersion; and then resistance heating the winding by passing current therethrough to further raise the temperature of the material that has coated the winding within the slots and built up on the end portion sufficiently to cure the adhered and built up material.

20. The method of claim 19 wherein the protective material is a solventless varnish.

* * * * *